April 7, 1959 E. H. LAND ET AL 2,880,660
PHOTOGRAPHIC PRODUCT AND APPARATUS
Filed Jan. 28. 1957 3 Sheets-Sheet 1

FIG. 1

INVENTORS
Edwin H. Land
and
BY Vaito K. Eloranta
Brown and Mikulka
and
Robert E. Corb
ATTORNEYS April 7, 1959   E. H. LAND ET AL   2,880,660
PHOTOGRAPHIC PRODUCT AND APPARATUS Filed Jan. 28. 1957   3 Sheets-Sheet 2

INVENTORS
Edwin H. Land
and
BY Vaito K. Eloranta
Brown and Mikulka
and
Robert E. Corb
ATTORNEYS

INVENTORS
Edwin H. Land
and
BY Vaito K. Eloranta
Browward Mikulka
and
Robert E. Cork
ATTORNEYS Н
United States Patent Office 2,880,660
Patented Apr. 7, 1959

2,880,660

PHOTOGRAPHIC PRODUCT AND APPARATUS

Edwin H. Land, Cambridge, and Vaito K. Eloranta, Needham, Mass., assignors to Polaroid Corporation, Cambridge, Mass., a corporation of Delaware Application January 28, 1957, Serial No. 636,650

17 Claims. (Cl. 95—13)

This invention relates to photographic apparatus and products, and, more particularly, to products including photosensitive sheet materials and fluid reagents for processing said sheet materials, and to apparatus in the form of cameras embodying and employing said products.

Numerous proposals have been made for photographic apparatus, particularly in the form of cameras, for exposing at least a frame of photosensitive sheet material and preferably a succession of frames and processing each frame after exposure thereof in conjunction with a separately supplied sheet of a second material by a fluid processing reagent distributed between the photosensitive frame and second sheet. In one form of camera of this type, for example, disclosed in Patent No. 2,435,720, issued February 10, 1948, the photosensitive sheet material is provided as a plurality of separate sheets, each containing an exposure frame arranged in stacked relation with one end of each photosensitive sheet connected to the opposite end of the next successive sheet by a leader. The second sheets are similarly arranged in a separate stack and connected by leaders and each second sheet mounts a container releasably carrying a fluid processing reagent. The stacks of photosensitive and second sheets are held in the camera apart from one another with the foremost photosensitive sheet located in position for exposure and successive photosensitive and second sheets comprising successive film units are drawn with the aid of said leaders between a pair of members for spreading the fluid processing reagent from the container associated with each second sheet between the sheets on the exposure frame. As a rule, the stacks of photosensitive and second sheets are supplied in separate containers or magazines adapted to be introduced into the camera and the camera, if it is of the folding type, comprises housing means for storing the two magazines apart from one another and a fluid-spreading device, including two members between which a pair of sheets comprising each film unit are moved, a lens and shutter assembly, a collapsible bellows, and an erecting mechanism for the lens and shutter assembly, and accordingly is quite bulky, complicated and expensive.

The construction of this type of camera can be simplified considerably and its size greatly reduced by providing the camera with two housing sections, each adapted to hold one of the stacks of sheets, pivotally secured to one another. A lens and shutter assembly is mounted on one of the sections and the two sections are joined by a simple, single-tuck bellows, such as is shown, for example, in copending application Serial No. 636,580, filed January 28, 1957, and retained relative to one another in operative position by a simple folding linkage.

Objects of the invention are: to provide a novel photographic product in the form of a film pack assemblage comprising a first magazine, at least a photosensitive sheet located for exposure within the first magazine, a second magazine pivotally secured to the first magazine, at least a second sheet within the second magazine adapted to be superposed with the photosensitive sheet, a container associated with one of the sheets and carrying a fluid reagent capable of processing the photosensitive sheet when distributed between the superposed sheets, a folding bellows joined at opposite sides between the first and second magazines and cooperating therewith, when the magazines are pivoted apart, to provide a dark chamber within which the photosensitive sheet may be photoexposed, and means associated with the second magazine for providing an exposure aperture opening into the dark chamber through which light may be transmitted for exposing the photosensitive sheet; to provide a film pack assemblage substantially as described including a plurality of interconnected photosensitive sheets arranged in stacked relation within the first magazine, an equal number of interconnected second sheets arranged in stacked relation within the second magazine and an equal number of containers of fluid processing reagents associated with the sheets; to provide a film pack assemblage substantially as described including means for superposing a photosensitive and a second sheet and spreading a fluid processing reagent between the sheets during withdrawal of the sheets from their respective magazines; and to provide a film pack assemblage substantially as described and so constructed that the exposure aperture is closed against the admission of light to the photosensitive sheet when the two magazines are pivoted together against one another.

Other objects of the invention are: to provide a novel photographic apparatus in the form of a folding camera comprising the above-described film pack assemblage and exposure means associated with the exposure aperture of the film pack assemblage for transmitting light through said aperture to a photosensitive sheet positioned for exposure within the first magazine; to provide a folding camera comprising two relatively movable housing sections connected by a folding bellows wherein at least one of the housing sections and the bellows comprise a film pack assemblage employed in combination with said camera; and to provide a film pack assemblage for use with the above-described camera capable of being dissociated from the camera at any time without danger of exposing a photosensitive sheet located within the film pack assemblage.

Further objects of the invention are: to provide a film pack assemblage substantially as described including a wall associated with the end of the second magazine remote from the end thereof at which said magazine is connected to the first magazine and having an exposure aperture, said magazine and said wall being adapted to be coupled with a lens and shutter assembly comprising a photographic apparatus to form a camera; to provide photographic apparatus as described, for use with the film pack assemblage described, and including a lens and shutter assembly adapted to be coupled with said second magazine and said wall and means for retaining the first and second magazines in operative position relative to one another; to provide a photographic apparatus substantially as described wherein said means for retaining the magazines in operative position comprises a novel view finder device; and to provide a camera as described characterized by its compactness, inexpensiveness, simplicity of construction comprising a minimum of parts, and its ease and facility of operation.

Other objects of the invention will in part be obvious and will in part appear hereinafter.

The invention accordingly comprises the product possessing the features, properties and the relation of components, and the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

In general, camera apparatus of the form envisioned by the present invention is intended for use with at least one and preferably a plurality of film units, each comprising a photosensitive sheet having an exposure frame comprising a light-sensitive material such as a silver halide emulsion, a second sheet having a print-receiving area generally coextensive with the exposure frame, and a container releasably carrying a fluid processing reagent associated with one of the sheets, preferably the second sheet. The film units are supplied as part of a film pack assemblage with the photosensitive sheets arranged in one stack and the second sheets, with containers associated therewith, arranged in a second separate stack. The photosensitive sheets are arranged so that the foremost or first sheet may be photographically exposed in the camera in the conventional manner and thereafter processed by being moved from the stack into superposition with a second sheet and the two sheets moved in superposition through a pressure-generating gap between a pair of members for effecting the release of the fluid contents of the container located between the sheets and the spreading of said fluid reagent in a layer between the exposure frame and print-receiving area. The photosensitive and second sheets are preferably opaque to actinic light so that the two superposed sheets comprising a film unit may be withdrawn from the camera as the fluid processing reagent is spread therebetween, and the fluid reagent is preferably quite viscous so that it adheres the two sheets together, preventing exposure of the photosensitive material. The individual photosensitive and second sheets in each stack are connected to one another by leaders whereby the sheets comprising each film unit may be manually withdrawn in succession into superposition from the camera between a pair of members providing a pressure-generating gap for spreading the fluid processing reagents.

The stack of interconnected photosensitive sheets is provided in a first container or magazine including a forward wall having an exposure aperture generally coextensive with the exposure frames of the photosensitive sheets within the first container, together with means for urging the stacks of photosensitive sheets toward the forward wall so that the foremost photosensitive sheet is in position for exposure. The stack of interconnected second sheets and fluid containers are provided in a second container or magazine and the first and second containers or magazines are located within the camera apart from one another with the foremost photosensitive sheet in position for exposure. The camera comprises a casing or housing having front and rear sections pivotally secured to one another and each adapted to hold one of the magazines of photosensitive and second sheets. The forward housing section holds the second container of second sheets and includes a conventional lens and shutter assembly and the rear housing section holds the first container of photosensitive sheets with the foremost photosensitive sheet positioned for exposure substantially at the focal surface of the lens. The two housing sections are pivotable from a folded or inoperative position, wherein they are located against one another and form a relatively compact structure, to an open or operative position wherein they are located at an angle with respect to one another in the general form of a V. A simple and preferably single-fold bellows is provided for connecting the two housing sections and providing an enclosed light path between the lens and shutter assembly on the forward section and a photosensitive sheet positioned for exposure within the rear section. A simple linkage is provided for holding the two housing sections in operative position relative to one another.

The film pack assemblage and camera of the present invention represent an improvement over other cameras of this general type in that the structure of the camera is substantially more compact and comprises fewer parts so that it is less complicated, easier to construct and operate, and less expensive. This is effected by the provision of a novel film pack assemblage which itself comprises many of the elements customarily included in the camera structure and is combined with the apparatus of the invention to form a camera. Instead of providing a camera comprising front and rear housing sections pivotally secured to one another and connected by a bellows, the present invention envisions a camera structure wherein the housing sections and bellows are provided as elements of an expendable film pack assemblage. This concept may be carried still further to the extent that the members providing the pressure-generating gap comprise the film pack assemblage so that the apparatus may merely comprise a lens and shutter assembly adapted to be coupled with the film pack assemblage and a view finder device which performs the added function of positioning the forward and rear housing sections in operative position relative to one another. As previously noted, the film pack assemblage can be constructed so as to contain sufficient materials for making several exposures, for example eight, and in such a manner that it is expendable and can be discarded following use. The combined camera and film pack assemblage for exposing and processing a succession of photosensitive sheets is simple, small and compact because a number of elements, usually found in the cameras, have been eliminated and their functions performed by fewer elements, and is inexpensive because many of these elements are intended to be employed for only a limited number of exposures and thereafter discarded, and therefore, can be constructed of inexpensive materials.

Reference is now made to the drawings wherein there is illustrated a novel film pack assemblage embodying the invention. This film pack assemblage, designated 10, comprises a magazine 12 containing a plurality of photosensitive sheets 14 arranged within the magazine in stacked relation and a magazine 16 pivotally secured at one end to magazine 12 by a hinge and containing a plurality of second sheets 20 arranged in stacked relation. Magazine 12 is generally rectangular in shape and comprises a rear wall 22, a forward wall 24 having therein a rectangular exposure aperture 26 and side walls 28 and an upper end wall 30 connecting the forward and rear walls. Magazine 12 also includes a lower end wall 32 which extends from the rear wall part way toward the forward wall so as to provide a narrow slot or passage 34 in the lower end of the magazine adjacent forward wall 24 through which a photosensitive sheet 14 may be withdrawn.

Magazine 16 is similar in construction and shape to magazine 12 and comprises a forward wall 36, rear wall 38 and side walls 40 and an upper end wall 42 joining the forward and rear walls together and a partial lower end wall 44 providing a slot or passage 46 in the lower end of magazine 16 through which second sheets 20 may be withdrawn. The two magazines 12 and 16 are formed of sheet material, preferably a material that is relatively stiff and inexpensive and is easy to fabricate such as cardboard and sheet metal, and are secured together at the lower ends of their respective forward and rear walls 24 and 38 by such means as a hinge which is also formed preferably of flexible sheet material such as paper, fabric or a plastic material. In the preferred form shown, walls 24 and 38 comprise the same sheet folded at the ends of the two walls.

Each photosensitive sheet 14 comprises a photosensitive layer, preferably a silver halide emulsion on a suitable light-opaque support sheet, and is generally rectangular in shape and larger than exposure aperture 26 which is adapted to define the exposure frame. Photosensitive sheets 14 are preferably mounted on a continuous leader or carrier strip 48 and are located within the magazine in stacked relation with leader strip 48 arranged in a zig-zag form so that it extends from the leading end of each photosensitive sheet behind the sheet toward the trailing end thereof and then in front of the next successive photosensitive sheet to the leading end thereof, thereby connecting the trailing end of each photosensitive sheet to the leading end of the next successive sheet. A pressure plate 47 and spring means 49 are provided within magazine 12 for urging the stack of photosensitive sheets 14 forward against wall 24 so that the foremost photosensitive sheet is always located against the forward wall in position for exposure across aperture 26.

Second sheets 20 are arranged in stacked relation and are mounted on the forward side of a continuous carrier or leader strip 50, also arranged in a zigzag form so that, in effect, the leading end of each second sheet is connected to the trailing end of the preceding sheet. Each second sheet 20 preferably comprises a print-receiving layer on a suitable light-opaque support sheet and the leader strip 50 comprises a thin sheet material, preferably paper. The photosensitive and second sheets and their respective carrier strips are so arranged that when a pair of photosensitive and second sheets are superposed, carrier strip 50 will be located between the photosensitive and print-receiving layers. Accordingly, carrier strip 50 is provided with apertures corresponding in size and shape to the exposure frame and located in the region of the print-receiving layer so as to define a print-receiving area bordered by portions of the carrier strip. These border portions, located between the photosensitive and print-receiving layers, serve as a mask for confining the spread of a fluid processing reagent between the two layers and limiting print formation to a predetermined print-receiving area of the second sheet.

The aforementioned fluid processing reagent is supplied in rupturable containers 52 preferably mounted, together with second sheets 20, on carrier strip 50. Each container 52 is mounted on the rear side of carrier strip 50, that is, on the opposite side from the second sheets 20 and adjacent the leading end of a second sheet and comprises a rectangular blank of a fluid-impervious sheet material folded lengthwise to provide two walls sealed together at their margins to form a fluid-carrying cavity. The longitudinal marginal portions of the container provide a discharge mouth adapted to become unsealed in response to the application of compressive pressure to the walls of the container and through which the fluid contents of the container are ejected unidirectionally. Each container is at least equal in length to the width of the exposure frame (and print-receiving area) and is secured to carrier strip 50 with the discharge mouth directed toward the print-receiving area of a second sheet so that its fluid contents will be discharged between a photosensitive sheet 14 and a portion of carrier strip 50 in the direction of a print-receiving area.

Figure 1:
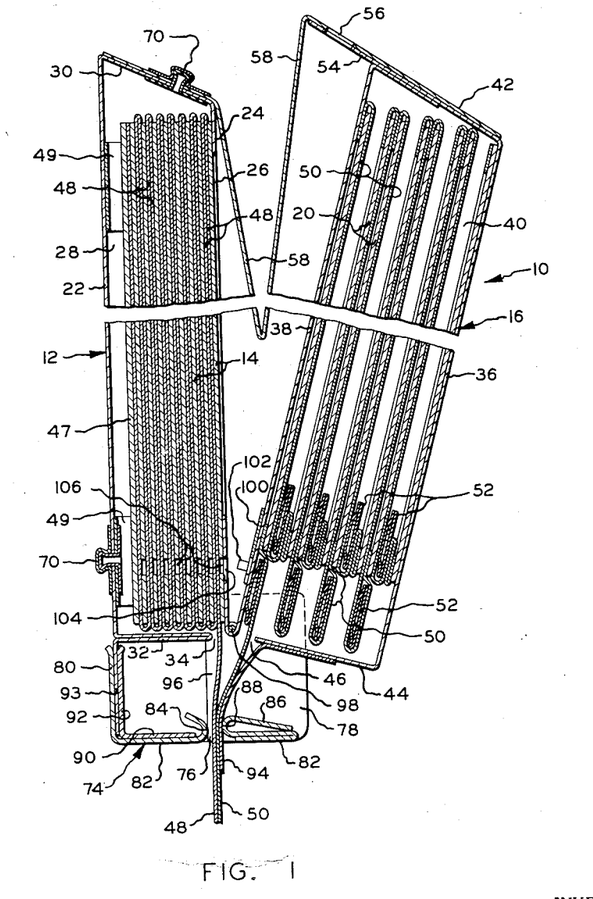
Figure 1 is an exaggerated sectional view of a film pack assemblage embodying the invention.
Figures 2, 3:
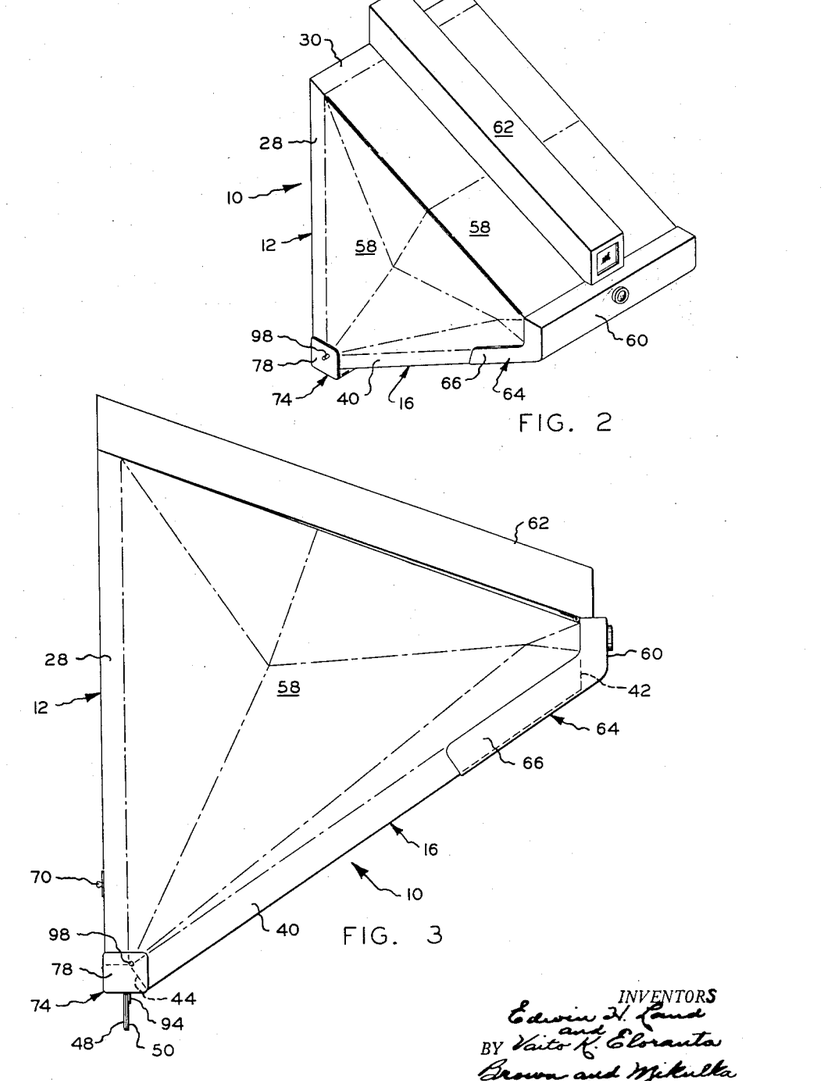
Fig. 2 is a perspective view of apparatus in the form of a camera embodying the film pack assemblage shown in operative position.
Fig. 3 is an elevational view of the camera of Fig. 2.
Figure 4:
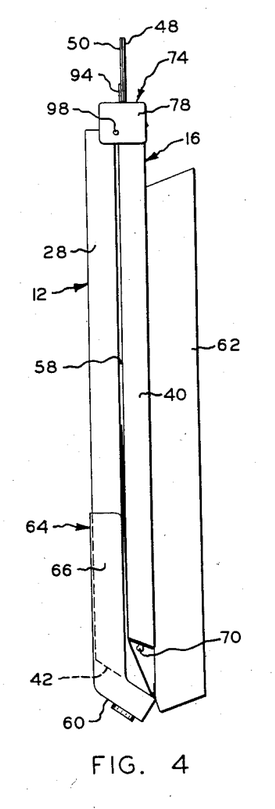
Fig. 4 is an elevational view of the camera of Figs. 2 and 3 illustrated in folded position.
Figure 5:
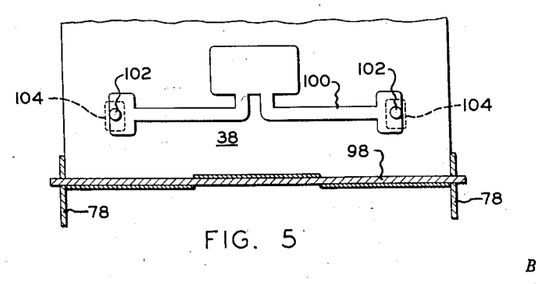
Fig. 5 is a fragmentary view, partially in section, showing a component of the film pack assemblage.

Containers 52, in their filled condition, are considerably thicker than the print-receiving sheets with which they are associated and, in order to reduce the dimensions, and particularly the thickness dimension, of magazine 16, containers 52 are arranged in staggered relation in two stacks, rather than on top of one another in a single stack. This arrangement may take either of two forms shown, for example, in Figs. 1 and 6. Each of these forms possesses a dimensional advantage over the other since in one form the magazine required to enclose the second sheets is slightly thinner than the other but is longer by about the length of one container. In the preferred arrangement shown in Fig. 1, each container 52 is attached to the carrier strip adjacent the leading end of a second sheet on the opposite side of the carrier strip from the second sheet. The containers associated with alternate sheets are arranged in stacked relation adjacent the leading ends of their respective sheets, while the other containers are arranged in stacked relation adjacent the first-mentioned stack of containers and overlying the leading end portions of their respective second sheets. These last-mentioned containers are secured to the carrier strip in such a way that the portion thereof which underlies the container and is substantially equal in length to the width of the container can be folded back upon itself between the container and the leading end portion of the second sheet with which the container is associated. In other words, only the leading half of the forward wall of the container is secured to the carrier strip.

Figure 6:
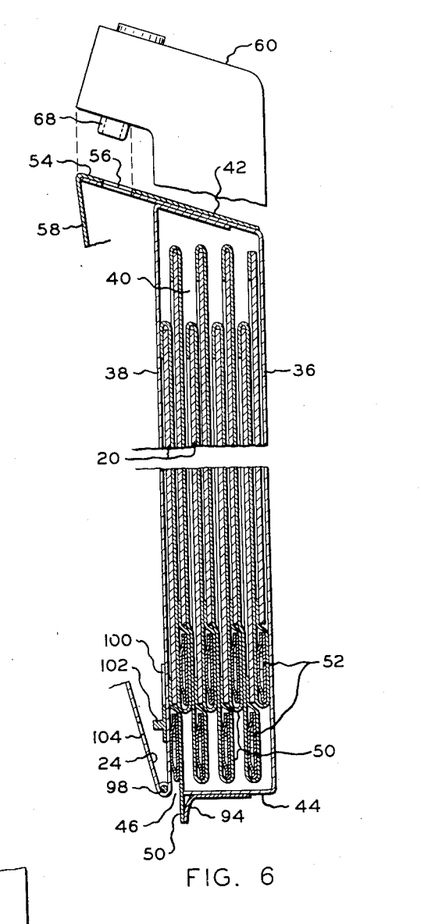
Fig. 6 is a view, partially in section, of another form of film pack assemblage embodying the invention together with a lens and shutter assembly.

Another arrangement of the second sheets and containers is shown in Fig. 6 and in this form each container is located beside and adjacent the leading edge of its respective second sheet and alternate second sheets and containers are both staggered so that the containers are arranged in two adjacent stacks. It is apparent that with the sheets and containers arranged in this manner the length of the assemblage (and magazine therefor) is increased by the width of a container and that the thickness of the magazine is slightly thinner than in the preferred arrangement, since it does not include the thickness of the end portions of the alternate second sheets located between alternate containers.

The fluid processing reagent is preferably quite viscous and is adapted to be spread in a thin layer between the superposed photosensitive and second sheets by movement of the sheets between a pair of pressure-applying members and preferably through a narrow convergent pressure-generating gap between a pair of substantially rigid fixed members. The width of this pressure-generating gap is generally equal to the thickness of the combined photosensitive and second sheets, the carrier strip for the photosensitive sheet and the layer of fluid reagent to be spread between the sheets. Since the width of the gap is substantially fixed, it is important that the total thickness of the materials which must pass through the gap, particularly in the region of a container, does not exceed the width of the gap. In the preferred form, this thickness in the region of the container is substantially equal to the width of the gap so that a complete discharge of the fluid contents of the containers is assured; and, accordingly, the thickness of the combined carrier strips, photosensitive sheet and the walls of the container is substantially equal to the width of the gap. Or, in other words, the thickness of the combined walls of the container and carrier strip for the container is substantially equal to the thickness of the combined second sheet and layer of fluid reagent.

The fluid reagent, when spread in a thin layer between an exposed photosensitive sheet and a second sheet, is preferably adapted to produce a positive print on the second sheet by a silver transfer-reversal process. For examples of the composition of fluid reagents useful for this purpose, together with descriptions of photosensitive and second sheets adapted to be employed in processes of this type, reference may be had to Patent No. 2,543,181, issued February 27, 1951, in the name of Edwin H. Land. The fluid reagent is adapted to be spread in a thin layer between the sheets to form a sandwich as the sheets are withdrawn in superposition from the apparatus in which the photosensitive sheets are exposed. Accordingly, the support sheets, comprising both the photosensitive and second sheets, are opaque to actinic light and the fluid reagent, being quite viscous, functions to adhere the two sheets together and may be provided, in one form, with a light-absorbing dye or pigment which will aid in preventing light from entering between the margins of the sheets and exposing photosensitive material as the sheets are withdrawn into the light.

The two magazines, when in operative position, are adapted to be located at an angle of approximately 60 degrees with respect to one another. The upper end of magazine 16 is provided with an upstanding wall 54 which is disposed substantially parallel with forward wall 24 of magazine 12 when the two magazines are located in operative position. Wall 54 is substantially rigid and self-supporting and is provided with an opening 56 adapted to be coupled with suitable exposure means such as a photographic objective lens for transmitting light to the foremost photosensitive sheet positioned for exposure within magazine 12. As previously mentioned, a bellows, designated 58, is provided for joining the two magazines and providing a dark chamber therebetween within which photosensitive sheets may be exposed. Bellows 58 is preferably the type having V-shaped side walls and a rectangular end wall, all adapted to fold inwardly with a single fold or tuck when the two magazines are pivoted together into closed position. Since the bellows is provided as part of a film pack assemblage 10 and is intended to be folded and unfolded only once for each exposure, for example eight times, it may be fabricated of inexpensive materials such as paper. The requisite stiffening can be provided, for example, by applying a fluid material, such as a plastic material, adapted to form a substantially stiff or rigid layer upon drying by spraying through a template or by printing methods. This type of bellows construction is advantageous in that it results in a considerable reduction in the cost of the camera employing the assemblage of the invention since permanent type bellows normally used in cameras and adapted to be folded and unfolded hundreds of times are a major expense item when the cost of the camera is determined.

Wall 54 is adapted to extend rearwardly beyond the upper end of magazine 12 when the two magazines are in closed or folded position adjacent one another. Since the bellows is of the inwardly folding type, the end and side walls thereof will be located between the two magazines and between wall 54 and magazine 12. The bellows, in its folded position, serves the additional function of closing opening 56 against the admission of light into magazine 12. By virtue of its construction, the assemblage may be supplied in its folded condition without any additional light-sealing means which must be removed prior to employment of the assemblage; and the assemblage may be withdrawn in a folded condition from association with the camera or other apparatus with which it is employed at any time, even though it may still contain photosensitive material, without danger of exposing the photosensitive materials. This arrangement permits the substitution of different film assemblages containing different types of film. When the assemblage is associated with apparatus including an exposure means coupled with opening 56 in wall 54, the exposure means will close the opening and prevent admission of light, except when desired, when the magazines are pivoted apart into operative position.

The film pack assemblage of the invention is adapted to be coupled with a device, preferably comprising a lens and shutter assembly, and a view finder to form a camera. This device comprises a lens and shutter assembly, designated 60, a view finder 62 and means for attaching the device to the magazines. View finder 62 is substantially elongated and pivotally mounted in its forward end to the housing of lens and shutter assembly 60. The lens and shutter assembly, in turn, is mounted on a frame 64 having a generally channel-shaped cross section with the converging sides 66 adapted to grip side walls 40 of magazine 16. For this purpose, side walls 40 are slightly convergent toward rear wall 38 so as to form a dovetail arrangement. The rear of the shutter housing is provided with a rearwardly extending collar 68 surrounding a rear lens aperture and adapted to project into opening 56 in wall 54 to form a light-tight seal with wall 54. Collar 68 may be formed of a yielding material such as rubber so as to produce a more effective light seal and to aid in retaining the lens and shutter assembly coupled with wall 54.

The device is coupled with a film pack assemblage by sliding the upper end portion of magazine 16 into frame 64 between sides 66 until collar 68 is engaged in opening 56 in wall 54. When the camera comprising the magazines and device is in a folded position, view finder 62 extends downwardly at the rear of magazine 16 and serves to hold the magazines in folded position. To aid this function, rear wall 22 of magazine 16 may be provided with the projecting member 70 of a snap fastener adapted to be engaged with the other member (not shown) of the fastener located on the rear end of the view finder. The view finder performs the further function of retaining the two magazines in open or operative position relative to one another and for this purpose upper end wall 30 of magazine 12 is provided with another fastener projecting member 70 adapted to be engaged in the member on the view finder. The walls of magazine 12 may require and be provided with some form of reinforcement in the regions of member 70, particularly when the magazine is formed of cardboard. It will be noted that the view finder, when the camera is in operative position, is located at an angle with respect to the optical axis of the camera. The optical system of the view finder, in most respects, is conventional in construction in that it comprises a Galilean telescope, and is provided with light-deviating components to adjust for the fact that is angularly disposed with respect to the camera axis.

A pressure-applying device 74 is provided for applying compressive pressure to each pair of photosensitive and second sheets as they are withdrawn in superposition from the camera comprising the magazines. Device 74 may comprise a part of the film pack assemblage and can be disposed therewith after use, or it may be mounted on frame 64, as is the lens and shutter assembly. Device 74, in the form shown, is an expendable component of the film pack assemblage secured to the lower end portions of the magazines across their intersection and slots 34 and 46. The device is fabricated from sheet metal and provides a substantially fixed pressure-generating gap 76 through which the sheets are moved in superposition. The device comprises two blanks of sheet metal shaped and secured together, for example, by welding. The first blank includes two side walls 78, a rear wall 80 and a lower end wall 82 having an elongated slot formed therein by folding a portion 84 of lower end wall 82 back upon itself toward rear wall 80. Portion 84, where it is bent, defines one side of a convergent pressure-generating gap 76. The other side of gap 76 is defined by a section 86 of end wall 82 folded back upon itself to provide a curved corner portion 88 which is again folded back upon itself so that corner portion 88 extends to a position closely adjacent portion 84 and defines the other side of gap 76. The rearmost section of wall 82 is reinforced by one side 90 of an L-shaped member which is secured to end wall 82. The other section 92 of the member is disposed closely adjacent rear wall 80 and cooperates therewith for gripping an extended wall section 93 of magazine 12.

Side walls 78, rear wall 80 and lower end wall 82 of device 74 comprise three sides of a chamber within which a pair of sheets may be superposed. Means are provided for closing the front of this chamber and, in the form shown, comprises a sheet 94 of flexible light-opaque material, such as paper, secured to lower end wall 44 of magazine 16 and extending from one of side walls 78 to the other and through gap 76. Light-sealing means are provided for preventing light from entering around the edges of sheet 94 and this light-sealing means, in one form, comprises a pair of tapered sheets 96 joined with the lateral edges of sheet 94. Sheets 96 may be tapered to the extent that they too will extend through gap 76. The gap, as previously noted, is approximately equal in thickness to the combined thickness of the sheet materials adapted to be withdrawn through the gap and the layer of fluid to be spread therebetween and this combined thickness must also include the thickness of sheet 94.

Additional means are provided for securing device 74 to the magazines and, in the form shown, comprises an elongated pin or rod 98 secured at its ends in side walls 78 and extending between rear wall 38 of magazine 16 and forward wall 24 of magazine 12 at the intersection of said walls. This arrangement will prevent movement of the device in the direction of movement of the sheets and to preclude movement of the device in the opposite direction, walls 24 and 38 may be provided with two spaced-apart slits at their intersection through which rod 98 extends so that the rod is disposed on opposite sides of portions of walls 24 and 38 at their intersection.

As a means for assuring registration of each pair of photosensitive and second sheets as they are withdrawn from their respective magazines through gap 76, the leaders attached to the first photosensitive and second sheets are secured to one another. The film pack assemblage is provided with these two leaders projecting through gap 76 in readiness to be grasped manually for withdrawing the succession of photosensitive and second sheets from the magazines. The inner surfaces of the leaders in a region adjacent the leading end of each sheet are provided with an adhesive material having a strong affinity for itself while adhering poorly or not at all to other materials. Thus, as a photosensitive and second sheet and the leaders attached to their trailing ends are withdrawn in superposition through gap 76, the adhesive material on the two leaders adheres the two leaders together, automatically registering the next successive pair of photosensitive and second sheets.

Each leader comprises what may be termed a trailing end portion and a leading end portion and each is preferably perforated or otherwise secured so that it will tear intermediate a pair of sheets between the leading and trailing end portions. Thus, as a photosensitive and second sheet are withdrawn in superposition through gap 76, the leaders attached to the next successive pair of photosensitive and second sheets will tear, leaving the leading end portions attached to the last-mentioned sheets secured together and extending through the gap where they may be manually grasped. The leading end portions of the leaders remain attached to the trailing ends of the sheets withdrawn from the gap. As a general rule, each container 52 is provided with an excess of fluid processing reagent so as to insure complete spread of the fluid between the sheets and these trailing end portions of the leaders provide means for trapping any excess fluid so that it is not squeezed from between the sheets so as to clog gap 76. The combined thickness of the material comprising the leaders is considerably less than the width of the gap so that the trailing end portions of the leaders can be spaced apart sufficiently to provide a space for trapping and retaining excess fluid.

Indexing means are provided for retaining the sheets in their respective magazines as a pair of sheets are withdrawn so that only one photosensitive and second sheet at a time can be withdrawn. For this purpose, it is necessary to engage and retain only one of a pair of sheets since the leaders attached to each pair of sheets are secured to another and if one cannot move, neither can the other. This means for holding and retaining the sheets in the form shown is adapted to engage the photosensitive sheets and specifically the foremost photosensitive sheet of the stack as the preceding photosensitive sheet is withdrawn from the magazine and comprises a spring element 100 mounted intermediate its ends on the lower end portion of rear wall 38. A pair of projecting members 102 are mounted on the free ends of spring element 100 and project, when the magazines are in closed position, through slots 104 in forward wall 24 into magazine 12. Projecting members 102 are biased by spring element 100 toward wall 24 and slots 104 are located adjacent the sides of wall 24 underlying the leading end portions of the photosensitive sheets within magazine 12. Slots 104 are so dimensioned as to permit limited movement of the projecting members in the direction of withdrawal of the photosensitive sheets from the magazine. Each of photosensitive sheets 14 is provided with a pair of apertures 106 located in its leading end portion adjacent the lateral edges thereof and underlying slots 104. Projecting members 102 project into the apertures in the foremost photosensitive sheet underlying the slots when the magazines are in closed position. When the magazines are pivoted apart into operative position, the projecting members, of course, are withdrawn from the apertures in the foremost photosensitive sheet, permitting withdrawal of that sheet from magazine 12. The indexing mechanism is intended to arrest the movement of the next successive pair of photosensitive and second sheets and hold the photosensitive sheet in position for exposure and, accordingly, the photosensitive sheets are withdrawn from the magazine when the magazines are in folded position. As previously noted, the projecting members are displaceable in the direction of movement of the photosensitive sheets to the limit of the slots so that, as a photosensitive sheet is withdrawn from magazine 12, projecting members 102 project into the apertures in the next successive photosensitive sheet and are displaced (downwardly) to the limit of their movement.

When the magazines are pivoted apart to make an exposure, the projecting members return under the bias of spring element 100 to their original position so that, when the magazines are once again folded together, the projecting members cannot enter the apertures 106 in the foremost photosensitive sheet and ride on the surface of the margins of the sheet as it is withdrawn until said sheet is out of the magazine and the projecting members may then enter the apertures in the next successive photosensitive sheet and are displaced thereby. The film pack assemblage is supplied initially either with the projecting members in the apertures in the foremost photosensitive sheet and in a displaced position or with the foremost photosensitive sheet in exposure position and the projecting members located against the sheet adjacent the apertures. Resilient elements 90 may be fabricated of a variety of resilient flexible materials, including molded plastic material which is preferred in view of its relatively low cost.

To operate the camera of the invention, the film pack assemblage, with the magazine in folded position, is coupled with the lens and shutter assembly with collar 68 engaged in opening 56 in wall 54. The two magazines are then pivoted apart and the snap fastener is employed to retain the magazines in operative position. Following exposure, the snap fastener is disengaged, the magazines are pivoted into closed position, and the leaders projecting from gap 76 are manually grasped for withdrawing a sandwich comprising a photosensitive sheet, a second sheet and a layer of processing reagent therebetween through the gap from the camera. As the sheets and the leader attached to the next successive pair of sheets are withdrawn, the projecting members enter the apertures in the next successive photosensitive sheet, arresting the movement of the sheets and the leaders tear intermediate the two pairs of sheets, leaving the leading end sections thereof secured together and projecting from the gap whereby the next successive pair of sheets can be withdrawn from the camera. The camera can be retained in folded position with the aid of the snap fastener element on the rear of magazine 12 and in this form is a very compact structure. The operation may be repeated for the remaining pairs of photosensitive and second sheets or at any time while in a folded position the assemblage may be disengaged from the lens and shutter assembly and view finder device and may be replaced by a similar film pack assemblage.

Since certain changes may be made in the above product and apparatus without departing from the scope of the invention herein involved, it is intended that all matter contained in the above description or shown in the accompanying drawings shall be interpreted as illustrative and not in a limiting sense.

What is claimed is:

1. A photographic product adapted to be employed for producing a photographic print and comprising, in combination, a first sheet-holding means comprising a first magazine having a forward wall and an exposure aperture in said wall, a plurality of photosensitive sheets arranged in stacked relation in said first magazine, said photosensitive sheets being connected to one another by leaders, means within said first magazine for locating the foremost of said photosensitive sheets against said forward wall across said aperture in position for exposure, a second sheet-holding means adapted to be associated with photographic exposure means, said second sheet-holding means comprising inner and outer walls providing a second magazine, a plurality of second sheets arranged in stacked relation within said second magazine between said inner and outer walls and adapted to be superposed with said photosensitive sheets, said second sheets being connected by leaders, a plurality of containers carrying a fluid processing reagent located within said second magazine in association with said second sheets, means pivotally securing said first and second magazines together adjacent one end thereof, said first and second magazines being pivotable with respect to one another between a first position wherein the other end portions of said magazines are located adjacent one another and a second position wherein said magazines are arranged at an angle with respect to one another, an upstanding wall mounted on said other end of said second magazine so as to extend substantially parallel with said forward wall of said first magazine when said magazines are located in said second position, said first and second magazines having openings in said one ends thereof through which said photosensitive and second sheets may be withdrawn, pressure-applying means associated with said one ends of said first and second magazines for superposing said photosensitive and second sheets and distributing said fluid processing reagent between said sheets during withdrawal thereof from their respective magazines, and a folding bellows extending between and connecting said first and second sheet-holding means, said bellows having substantially three walls attached to said first and second magazines and said upstanding wall and being so constructed as to fold inwardly between said magazines when the latter are pivoted toward one another into said first position and to cooperate with said inner wall of said second magazine for providing a chamber between said magazines when the latter are in said second position, said upstanding wall including an aperture communicating with said chamber provided by said bellows and magazines, said upstanding wall being adapted to be coupled with exposure means for transmitting light to a photosensitive sheet positioned for exposure within said first magazine.

2. A photographic product adapted to be employed for producing a photographic print and comprising, in combination, a first sheet-holding means comprising a first magazine having a forward wall and an exposure aperture in said wall, a plurality of photosensitive sheets arranged in stacked relation in said first magazine, said photosensitive sheets being connected to one another by leaders, means within said first magazine for locating the foremost of said photosensitive sheets against said forward wall across said aperture in position for exposure, a second sheet-holding means adapted to be associated with photographic exposure means, said second sheet-holding means comprising a second magazine, a plurality of second sheets arranged in stacked relation within said second magazine and adapted to be superposed with said photosensitive sheets, said second sheets being connected by leaders, a plurality of containers carrying a fluid processing reagent located within said second magazine in association with said second sheets, means pivotally securing said first and second magazines together adjacent one end thereof, said first and second magazines being pivotable with respect to one another between a first position wherein the other end portions of said magazines are located adjacent one another and a second position wherein said magazines are arranged at an angle with respect to one another, said first and second magazines having openings in said one ends thereof through which said photosensitive and second sheets may be withdrawn, pressure-applying means associated with said one ends of said first and second magazines for superposing said photosensitive and second sheets and distributing said fluid processing reagent between said sheets during withdrawal thereof from their respective magazines through said openings, a folding bellows extending between and connecting said first and second sheet-holding means, said bellows having substantially three walls attached to said first and second magazines and being so constructed as to fold inwardly between said magazines when the latter are pivoted toward one another into said first position and to cooperate with inner walls of said magazines to provide a chamber between said magazines when the latter are in said second position, and resilient means mounted on a wall of said second magazine located closely adjacent said forward wall of said first magazine when said magazines are in said first position, said resilient means mounting members projecting into said first magazine for engaging and retaining said foremost photosensitive sheet in position for exposure and against withdrawal movement from said first magazine when said magazines are in said first position.

3. A photographic product adapted to be employed for producing a photographic print and comprising, in combination, a first sheet-holding means comprising a first magazine having a forward wall and an exposure aperture in said wall, a plurality of photosensitive sheets arranged in stacked relation in said first magazine, said photosensitive sheets being connected to one another by leaders, means within said first magazine for locating the foremost of said photosensitive sheets against said forward wall across said aperture in position for exposure, a second sheet-holding means adapted to be associated with photographic exposure means, said second sheet-holding means comprising a second magazine, a plurality of second sheets arranged in stacked relation within said second magazine and adapted to be superposed with said photosensitive sheets, said second sheets being connected by leaders, a plurality of containers carrying a fluid processing reagent located within said second magazine in association with said second sheets, means pivotally securing said first and second magazines together adjacent one end thereof, said first and second magazines being pivotable with respect to one another between a first position wherein the other end portions of said magazines are located adjacent one another and a second position wherein said magazines are arranged at an angle with respect to one another, said first and second magazines having openings in said one ends thereof through which said photosensitive and second sheets may be withdrawn, pressure-applying means associated with said one ends of said first and second magazines for superposing said photosensitive and second sheets and distributing said fluid processing reagent between said sheets during withdrawal thereof from their respective magazines through said openings, a folding bellows extending between and connecting said first and second sheet-holding means, said bellows having walls attached to said first and second magazines and being so constructed as to fold inwardly between said magazines when the latter are pivoted toward one another into said first position and to provide a chamber between said magazines when the latter are in said second position, and resilient means mounted intermediate its ends on the lower portion of a wall of said second magazine located closely adjacent said forward wall of said first magazine when said magazines are in said first position, the end portions of said resilient means being free for movement toward and away from the last-mentioned wall and in a plane parallel thereto, said resilient means having members mounted on the ends thereof and projecting into said first magazine through slots provided in said forward wall of said first magazine at the lower end thereof adjacent the sides of said first magazine, said photosensitive sheets being provided with apertures in their margins underlying said slots in position to receive said members, said members projecting through said slots into said openings in said foremost photosensitive sheet when said magazines are located in said first position whereby said foremost photosensitive sheet is retained in position for exposure and against withdrawal movement from said first magazine, said members being displaceable in said slots in the direction of withdrawal of said photosensitive sheets from said first magazine.

4. A photographic product in the form of apparatus for producing a photographic print and comprising, in combination, a first sheet-holding means having generally rectangular front and rear walls, side walls and upper and lower end walls connecting said front and rear walls, a generally rectangular exposure aperture in said front wall and a slot in said lower end wall, at least a photosensitive sheet within said first sheet-holding means, means within said first sheet-holding means for locating said photosensitive sheet in position for exposure against said forward wall across said aperture, a second sheet-holding means adapted to be associated with photographic exposure means, said second sheet-holding means comprising substantially rectangular front and rear walls, side walls and upper and lower end walls connecting said front and rear walls and a slot in said lower end wall, at least a second sheet located within said second sheet-holding means and adapted to be superposed with said photosensitive sheet, a container carrying a fluid processing reagent associated with said second sheet within said second holding means, means pivotally connecting said first and second holding means at the lower ends of their respective front and rear walls adjacent said slots, said first and second holding means being pivotable with respect to one another between a first position wherein the last-mentioned front and rear walls are located adjacent and generally parallel with one another and a second position wherein said first and second holding means are positioned within said last-mentioned front and rear walls at an angle with respect to one another, means associated with the lower end portions of said first and second holding means for superposing said photosensitive and second sheets and distributing said fluid processing reagent between said sheets during withdrawal thereof from their respective sheet-holding means through said openings, a folding bellows extending between and connecting said first and second sheet-holding means, and an upstanding wall mounted on the upper end of said second sheet-holding means so as to extend substantially parallel with said front wall of said first sheet-holding means when said sheet-holding means are located in said second position, said bellows having an upper wall and side walls attached to said first and second holding means and said upstanding wall and being so constructed as to fold inwardly between said holding means when the latter are pivoted toward one another into said first position and to cooperate with the inner walls of said holding means to provide a chamber between said holding means when the latter are in said second position, said upstanding wall including an aperture communicating with said chamber provided by said bellows and being adapted to be coupled with exposure means for transmitting light to a photosensitive sheet positioned for exposure within said first sheet-holding means.

5. Photographic apparatus in the form of a camera for producing a photographic print and comprising, in combination, a photographic film assemblage comprising a first sheet-holding means, at least a photosensitive sheet within said first sheet-holding means located in position for exposure, a second sheet-holding means, at least a second sheet located within said second sheet-holding means and adapted to be superposed with said photosensitive sheet, means containing a fluid processing reagent located within one of said sheet-holding means in association with one of said sheets, means pivotally securing said first and second sheet-holding means together adjacent one end thereof, said first and second holding means being pivotable between a first position wherein the other ends thereof are located adjacent one another and a second position wherein said sheet-holding means are arranged at an angle with respect to one another, pressure-applying means associated with said one end of said first and second sheet-holding means for superposing said photosensitive and second sheets and distributing said fluid processing reagent between said sheets during withdrawal thereof from their respective sheet-holding means through openings therein, and a folding bellows extending between and connecting said first and second sheet-holding means, said bellows being so constructed as to fold inwardly between said holding means when the latter are in said first position and to provide a chamber between said holding means when the latter are in said second position, and an exposure device removably secured to said assemblage, said device comprising a frame member so constructed as to be removably secured to said second sheet-holding means, a lens and shutter assembly mounted on said frame member adjacent said other end of said second sheet-holding means, a view finder pivotally mounted at one end on said lens and shutter assembly, and mutually engageable means on the other end of said view finder and a portion of said other end of said first sheet-holding means for releasably securing said view finder to said first sheet-holding means when said sheet-holding means are in said second position for retaining them in said second position.

6. The photographic apparatus of claim 5 wherein said first sheet-holding means comprises a magazine having a forward wall and an exposure aperture in said wall, a plurality of said photosensitive sheets are provided arranged in stacked relation in said first magazine and are connected to one another by leaders, means are provided within said first magazine for urging the foremost of said photosensitive sheets against said forward wall across said aperture in position for exposure, said second sheet-holding means comprises a second magazine, a plurality of said second sheets are provided arranged in stacked relation within said second magazine and are connected by leaders, and a plurality of containers carrying said fluid processing reagent are provided located within said second magazine in association with said second sheets.

7. The photographic apparatus of claim 6 wherein said forward wall of said first magazine and the rear wall of said second magazine comprise a unitary sheet-like element folded at the intersection of said two walls, said pressure-applying means includes at least a pair of members spaced a predetermined distance apart to provide a narrow gap of predetermined width through which said sheets are withdrawn and at least two side members extending exteriorly of the side walls of said first and second magazines, and said pressure-applying means is secured to said magazines by an elongated member secured at its ends to said side members of said pressure-applying means and extends therebetween on opposite sides of portions of said sheetlike element at said intersection of said walls.

8. The photographic apparatus of claim 6 wherein said second magazine includes side walls which are convergent toward said rear wall thereof and said frame member comprises a channel having converging sides located in engagement with said convergent side walls of said second magazine.

9. The photographic apparatus of claim 6 wherein said photosensitive sheets are mounted on a first carrier strip, said second sheets are mounted on a second carrier strip and said containers are mounted on said second carrier strip with one container being located adjacent the leading end of each of said second sheets and with alternate containers arranged in two separate stacks.

10. The photographic apparatus of claim 6 including resilient means mounted on said second sheet-holding means and having members projecting into said first sheet-holding means for engaging and retaining said foremost photosensitive sheet in position for exposure and against movement from said first sheet-holding means when said sheet-holding means are in said first position.

11. The photographic apparatus of claim 10 wherein said resilient means is mounted intermediate its ends on said rear wall of said second magazine adjacent said one end thereof, said members are located on the ends of said resilient means and are free for movement toward and away from said rear wall and in a plane parallel thereto, said forward wall of said first magazine is provided at its lower end with slots located adjacent the sides of said first magazine in position to receive said members, said photosensitive sheets are provided with apertures in their margins underlying said slots in position to receive said members, said members project through said slots into said openings in said foremost photosensitive sheet when said magazines are located in said first position, and said members are displaceable in said slots in the direction of withdrawal of said photosensitive sheets from said first magazine.

12. The photographic apparatus of claim 5 including an upstanding wall mounted on the upper end of said second magazine so as to extend substantially parallel with said front wall of said first magazine when said magazines are located in said second position, said bellows being connected to said upstanding wall and said upstanding wall including an aperture communicating with said chamber provided by said bellows, said upstanding wall being coupled with said lens and shutter assembly for transmitting light to a photosensitive sheet positioned for exposure within said first magazine.

13. The photographic apparatus of claim 12 wherein said lens and shutter assembly includes a housing having a rear wall and a rearwardly projecting lip on said rear wall of said lens and shutter housing surrounding an exposure aperture in said rear wall, said lip projecting into and being engaged in said aperture in said upstanding wall.

14. In a photographic apparatus comprising a pair of casing sections secured together for pivotal movement with respect to one another between a first position wherein said sections are located adjacent and generally parallel with one another and a second position wherein said sections are located at an angle with respect to one another, one of said sections comprising outer and inner walls providing a chamber for holding a plurality of photographic sheets arranged in stacked relation and adapted to be manually withdrawn in succession from one end of said chamber when said sections are in said first position, the combination, in said apparatus, of indexing means mounted on said inner wall for retaining each successive sheet against movement within said chamber at a predetermined position as another of said sheets is withdrawn from said chamber, said means being responsive to pivotal movement of said sections from said first position to said second position for releasing said indexing means to permit the withdrawal of one of said sheets and responsive to pivotal movement of said sections from said second to said first position for resetting said indexing means for engaging and arresting the movement of the next successive sheet from said chamber.

15. Photographic apparatus as defined in claim 14 wherein said indexing means comprises resilient means mounted on said inner wall exterior of said chamber and at least one engagement member secured to said resilient means, and wherein said inner wall is provided with an aperture underlying said engagement member whereby said member can project through said aperture into said chamber and into engagement with said sheets.

16. Photographic apparatus as defined in claim 14 wherein said inner wall is provided with a pair of apertures adjacent the sides of said chamber and said indexing means comprises a resilient member mounted intermediate its ends on said inner wall between said apertures and exterior of said chamber, the free ends of said resilient means being biased away from said inner wall, and a pair of engagement members mounted on said free ends of said resilient member in alignment with said apertures, the other of said casing sections including portions for engaging and moving said engagement members through said apertures into said chamber when said casing sections are pivoted into said first position, said engagement members being adapted, when moved into said chamber, to engage portions of one of said sheets for retaining said one sheet against movement, said engagement members being released for displacement from said chamber under the bias of said resilient means by pivotal movement of said casing sections apart from one another into said second position.

17. The photographic apparatus of claim 16 wherein said apertures in said inner wall are so proportioned as to permit limited movement of said engagement members in the direction of withdrawal movement of said sheets from said chamber, said engagement members being adapted to be engaged by portions of each successive sheet as the preceding sheet is withdrawn from said chamber and displaced by the first-mentioned sheet in the direction of withdrawal movement of said sheets to the limit of said apertures, said engagement members being adapted to return to their original positions when said sections are pivoted apart into said second position whereby said engagement members are located out of engagement with said portions of the first-mentioned sheet when said casing sections are again pivoted into said first position, and said first-mentioned sheet is free to be withdrawn from said chamber and said engagement members are located so as to be engaged and displaced by portions of the next succeeding sheet.

References Cited in the file of this patent

UNITED STATES PATENTS

| | | |
|---|---|---|
| 1,184,110 | Linder | May 23, 1916 |
| 2,435,720 | Land | Feb. 10, 1948 |

FOREIGN PATENTS

| | | |
|---|---|---|
| 24,350 | Great Britain | Nov. 29, 1901 |